United States Patent [19]

Soultatis

[11] Patent Number: 4,722,555

[45] Date of Patent: Feb. 2, 1988

[54] QUICK-CONNECT COUPLING HAVING HEADS UNIFIED WITH PIPE

[76] Inventor: Apostolos K. Soultatis, 29 Evrialis St., Kifissia, Attica, Greece

[21] Appl. No.: 842,127

[22] Filed: Mar. 20, 1986

[51] Int. Cl.[4] .............................................. F16L 37/20
[52] U.S. Cl. ........................................ 285/5; 285/284; 285/311; 285/156
[58] Field of Search ...................... 285/5, 6, 284, 297, 285/311

[56] References Cited

U.S. PATENT DOCUMENTS

| 1,982,732 | 12/1934 | Fletcher et al. | 285/284 X |
| 2,256,845 | 9/1941 | Lanninger | 285/5 |
| 2,459,389 | 1/1949 | Newman | 285/5 |
| 2,627,427 | 2/1953 | Engelman | 285/5 |
| 3,208,776 | 9/1965 | Buschow | 285/284 |
| 3,642,306 | 2/1972 | Gheen et al. | 285/5 |
| 3,866,951 | 2/1975 | DeLoach | 285/5 |
| 3,889,982 | 6/1975 | Trunnell | 285/5 |
| 3,910,610 | 10/1975 | Turner et al. | 285/337 |
| 3,984,133 | 10/1976 | Bird | 285/156 X |

FOREIGN PATENT DOCUMENTS

| 966732 | 9/1957 | Fed. Rep. of Germany | 285/311 |
| 1104275 | 4/1961 | Fed. Rep. of Germany | 285/311 |
| 975778 | 8/1962 | Fed. Rep. of Germany | 285/311 |
| 1202038 | 1/1960 | France | 285/5 |
| 473954 | 9/1953 | Italy | 285/5 |
| 501104 | 9/1956 | Italy | 285/5 |
| 153672 | 3/1956 | Sweden | 285/5 |
| 165909 | 1/1959 | Sweden | 285/5 |
| 792407 | 3/1958 | United Kingdom | 285/6 |

Primary Examiner—Thomas F. Callaghan
Attorney, Agent, or Firm—Martin Smolowitz

[57] ABSTRACT

A quick-connect pressurizable coupling assembly having mating male and female head parts each integrally attached to an outwardly flared pipe end by being cast around the pipe. The male head part is provided at its forward end with an angled sealing surface having an adjacent annular radial outward projection. The female part is provided at its forward end with an annular shaped inner recess for retaining a resilient sealing ring and it also has an annular outer curved surface. A clamping unit encircles the female part curved surface, and is equipped with an annular clamping ring having at least one short hook and at least one long hook having a handle grip and pivotally attached to the clamping ring. The two hooks are adapted for attachment to the annular radial projection of the male part, thereby providing for the male and female head parts to be conveniently connected together to provide a pressurizable joint for the pipes.

8 Claims, 3 Drawing Figures

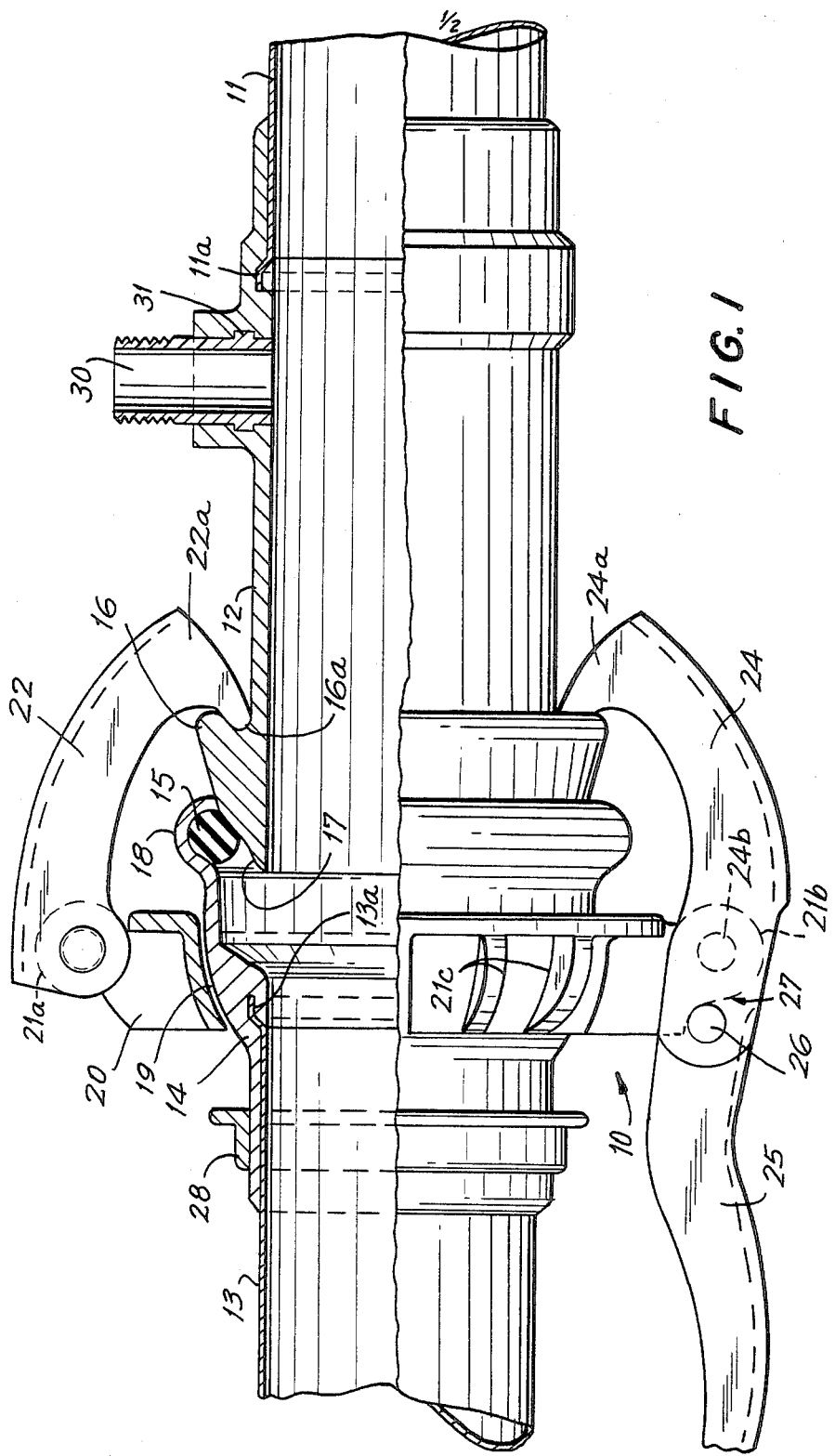

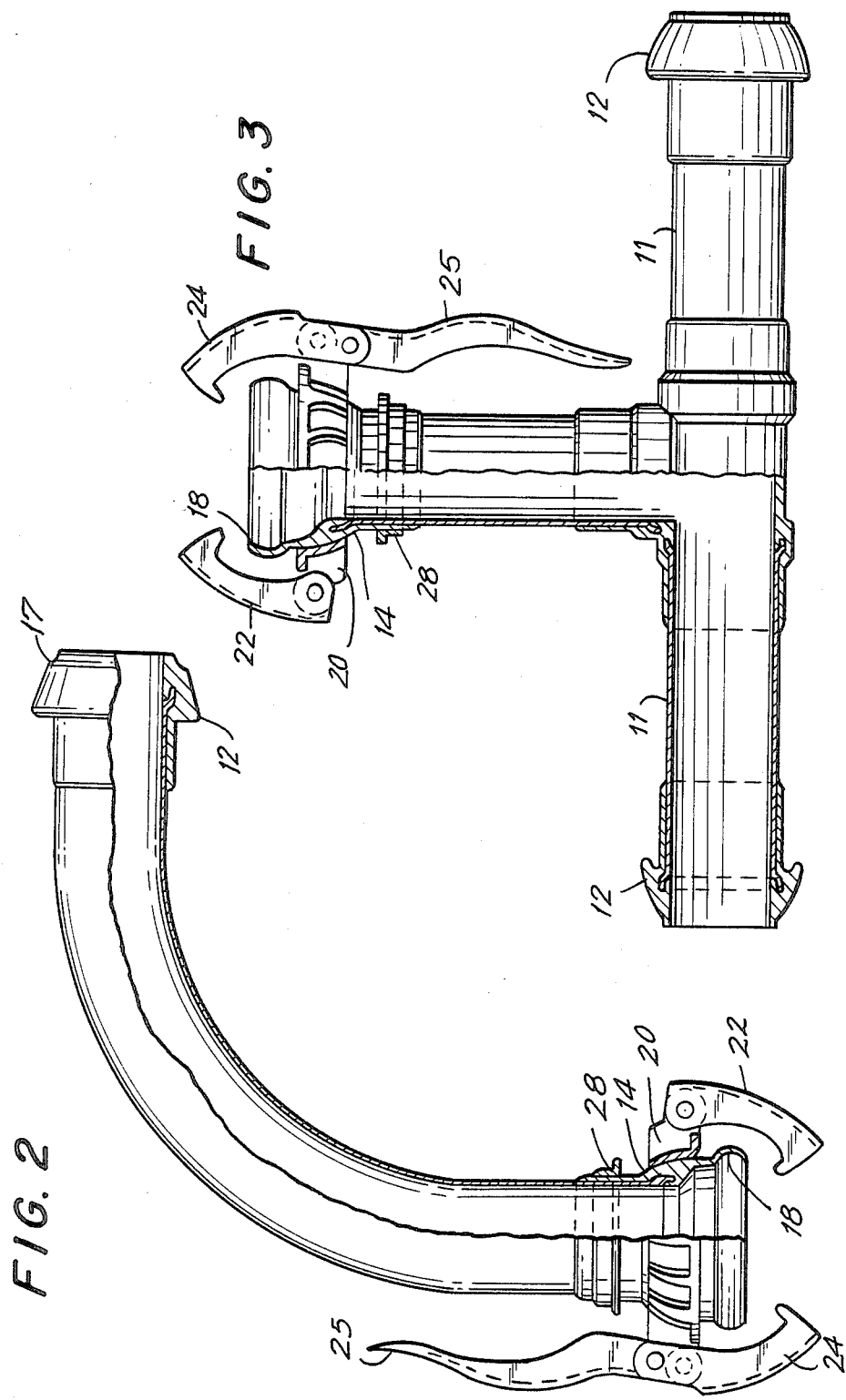

QUICK-CONNECT COUPLING HAVING HEADS UNIFIED WITH PIPE

BACKGROUND OF THE INVENTION

This invention pertains to quick-connect pressurizable coupling having heads each unified with a pipe. It pertains particularly to a quick connect coupling assembly having male and female head parts which are each integrally attached by casting to pipe ends, the head parts being quickly clamped together to provide a pressurizable coupling between the pipes.

Quick-connect type couplings have been known and used for some time in various applications, such as for connecting together metal pipes for conveying water for temporary water supply, agricultural irrigation, and fire-fighting applications. The pipes are connected together in various ways in order to obtain convenient and safe conveyance of the water without significant leakage. If the pipe network is not permanent as for most irrigation installations, the connectors used for joining the pipes together are extremely important. In the past such piping connections have generally used flanges which were threaded or welded onto the pipes and connected to an adjacent flange by bolting. However, such joints require considerable labor and expense to construct and connect together and are thus undesirable. Also, quick-connect coupling heads have been previously connected to pipes by adhesive bonding or by welding. However, such connections require a separate manufacturing step and are often subject to some leakage. For this reason, various quick-connect couplings having head parts which are integrally attached to the end of pipes have been needed. Research effort has been conducted to discover an improved and efficient method for joining coupling heads to pipes and for joining together such coupling units to provide an improved coupling assembly. Use of such coupling units allows rapid, safe and inexpensive construction of a required piping network.

SUMMARY OF INVENTION

The present invention provides a quick-connect type coupling assembly comprising mating male and female head parts which are each integrally attached to a pipe during initial construction of the coupling head parts. Attachment of each head part to a pipe is provided by casting the head part around an outwardly flared end of the pipe. The coupling head parts are constructed of a castable metal such as aluminum, brass, iron and similar materials. The coupling assembly male head part and female head part are conveniently and quickly connected together by a clamping unit having at least two hooks pivotably attached at diametrically opposed positions to a clamping ring provided encircling the female part.

The coupling assembly according to the invention is advantageously adapted for being quickly and conveniently connected together to provide pressurizable substantially leak-tight joints for conveying fluids such as water. The coupling head parts can be integrally attached to opposite ends of either straight or curved pipes, or to tee type connection joints.

BRIEF DESCRIPTION OF DRAWINGS

This invention will be further described with reference to the following drawings, in which:

FIG. 1 shows a preferred embodiment of the quick-connect coupling assembly, with the male and female parts being each integrally attached to a pipe in accordance with the invention.

FIG. 2 shows the male and female parts of the quick-connect coupling assembly each attached to opposite ends of a curved pipe.

FIG. 3 shows male and female parts of the quick-connect coupling assembly attached to opposite ends of a tee connection.

DETAILED DESCRIPTION OF INVENTION

This invention discloses a quick-connect coupling assembly 10 integrally attached to pipes, as is generally shown in the FIG. 1 drawing. The assembly includes a male head part 12 integrally attached to pipe 11 and a female head part 14 integrally attached to a pipe 13. The male part 12 can be conveniently and sealably coupled to the female head part 14 integrally attached to pipe 13 by using a resilient seal ring 15 located between the male and female parts.

The male part 12 is provided at its forward end with a forward angled sealing surface 17 having an adjacent annular extension 16, which contains an annular recess 16a located around the extension rearward portion. The sealing surface 17 is angled at 30°–45° with the centerline of male part 12. The female part 14 is shaped to have at its forward end an annular inner recess 18, which is circular shaped for receiving and retaining seal ring 15 in the recess. The inner diameter of seal ring 15 is slightly greater than the diameter sealing surface 17 of the male part 12, and ring 15 is arranged for mating with sealing surface 17 of the male part. The seal ring 15 has a circular cross-sectional shape like an O-ring and is composed of a resilient material such as rubber or plastic, and provides an effective seal between the male and female head parts 12 and 14. Also, located rearwardly from the inner recess 18, the female head part 14 is provided with an outer curved annular surface 19 shaped for receiving a movable clamping unit 20.

The clamping unit 20 includes a clamp ring 21 having at least two radial extensions 21a and 21b which are circumferentially equally spaced from each other on the clamp ring. Pivotally attached to the extension 21a there is provided a short hook 22 having a forward hooked portion 22a. Also, attached to extension 21b is a long hook 24 having a forward hooked portion 24a and an elongated rear handle grip 25. Short hook 22 is pivotally attached at its rearward end to the clamping ring 21, and at its forward end has the hooked portion 22a which is shaped to be received into the annular recess 16a of annular extension 16 of the male head part 12. The long hook 24 is constructed similarly to short hook 22 and is pivotally attached at its rearward end to radial extension 21b of clamping ring 21, and has the hook 24a at its other end also shaped for engagement into recess 16a of annular extension 16. Also, for long hook 24 the handle grip 25 is equipped with a pivot pin 26 located rearward of pivot pin 24b and arranged to provide a toggle action for locking behind ridge 27 of the clamping ring 21, and thereby serve to compress seal ring 15. A plurality of radially oriented ribs 21c are provided on the outer surface of clamp ring 21 to assure adequate rigidity for the ring. By such clamping and locking action, the sealing O-ring 15 is compressed between the male and female part surfaces 17 and 18 respectively sufficiently to provide a pressure-tight sealed joint.

The clamping unit 20 is retained in an useful position near outer curved surface 19 by an annular stopper ring 28 secured around the female head part 14 rearwardly from the curved surface 19. It will be understood that the male and female parts of the quick-connect coupling assembly 10 are each integrally attached to opposite ends of the pipes 11 and 13, respectively, as generally shown by FIG. 1, as subsequently described herein.

In an alternative embodiment of the invention, the male head part 12 can be conveniently provided with an auxillary branch or lateral connection 30 having annular shoulder 31, which connection is integrally attached to a side portion of the male part, as generally shown in FIG. 1

The quick-connect coupling assembly 10 of the present invention can be used with substantially straight elongated lengths of pipe, for which the male and female head ends 12 and 14 are shown in FIG. 1. Alternatively, the coupling assembly 10 can be used with elbow type joints, such as a 90° sweep elbow as shown in FIG. 2, with the male head part 12 and female head part 14 being attached at opposite ends of the elbow. Also, the male and female parts can be affixed at the three ends of a tee connection, such as shown in FIG. 3.

The quick-connect coupling assembly 10 can be provided integrally connected to pipes having diameters within the range of 1.5-6 inches. The pipes can have any desired length such as 10-50 ft. for convenient handling and installation to provide a piping system for conveying a pressurized fluid. The coupling assembly is suitable for internal pressures up to about 50 atmospheres.

In the method of constructing the coupling head parts integral with a pipe, the pipe ends all preferbly flared radially outwardly to have a radius about 0.125-0.200 inch greater than the pipe radius. The resulting flared end 11a of the pipe 11 is then inserted into a mold and a suitable castable molten metal or metal alloy such as aluminum, brass, or iron is cast around the flared pipe end to thereby provide a pressure-tight joint with the pipe 11, and produce male head part 12 as is generally shown in FIG. 1. Also, if a lateral outlet connection 30 is desired in the male head part, the fitting 30 having annular outer ring 31 is also placed in the mold and the molten metal is cast around the fitting 30 simultaneously with casting the metal around the flared end 11a of pipe 11, so as to provide a pressure-tight joint for the connection 30. Similarly, flared end 13a of pipe 13 is inserted into a mold and a castable molten metal is cast around the flared pipe to produce female head part 14, as is also shown in FIG. 1.

The invention will be further described by reference to a typical example of construction of a quick-connect coupling assembly, which should not be construed as limiting the scope of the invention.

EXAMPLE

A quick-connect coupling assembly is constructed by providing two aluminum pipes each having an outwardly flared end, and then casting molten aluminum male and female head parts integral with each pipe flared end in suitable molds. The coupling assembly parts have the following dimensions:

Coupling and pipe inner diameter, in.: 2
Pipe flared outer diameter, in.: 2.25
Male part outer diameter, in.: 3.125
Female part outer diameter, in.: 3.5
Diametral spacing between hook pivots: 4.75
Seal ring inside diameter, in.: 2.50
Seal ring cross-sectional diameter, in.: 0.350-0.380

In the integral attachment of each coupling end to the pipe, the pipe end is flared outwardly and inserted into a mold, and the molten aluminum is cast integrally around the pipe end to produce the coupling head part, as generally shown in FIG. 1, so that the coupling part becomes one pressure-tight unit with the pipe. A lateral connection is provided in the male part by a fitting being placed laterally in the mold and the male part is cast around the fitting, as also generallly shown in FIG. 1.

Although this invention has been disclosed broadly and in terms of a preferred embodiment, it will be understood that modifications and variations can be made all within the scope of the invention as defined by the following claims.

I claim:

1. A quick-connect coupling assembly having mating head parts each integrally attached to a pipe, comprising:
    (a) a male head part integrally attached to an end of a pipe, said male part having located at its forward end a radially outwardly extending annular ring having an annular recess, said pipe end being flared radially outwardly and said male head part being integrally cast around the flared pipe end;
    (b) a female head part integrally attached to an end of a pipe, said female part having located at its forward end an inner curved recess adapted for receiving an annular seal ring and having a curved outer surface located rearwardly from the inner recess, said pipe end being flared radially outwardly and said female head part being integrally cast into the flared pipe end;
    (c) a resilient circular-shaped seal ring provided in the inner curved recess of said female head part for sealing against an outer surface of said male head part; and
    (d) a clamping unit encircling said female head part and adapted to mate with the curved outer surface of said female head part, said clamping unit having a clamp ring and at least one short hook and at least one long hook having a handle grip pivotally attached to the clamp ring, said hooks being adapted for engaging the annular recess of said male head part, whereby said male head part and said female head part can be quickly and sealably attached together to provide a coupling assembly.

2. A coupling assembly according to claim 1, wherein said male head part forward end is angled at 30°-45° with the axial center line of the male part.

3. A coupling assembly according to claim 1, wherien said male head part and female head part are each made of cast aluminum.

4. A coupling assembly according to claim 1, wherein the resilient seal ring is composed of an elastomer material.

5. A coupling assembly according to claim 1, wherein said long hook is clamped to said male head part by a toggle device.

6. A coupling assembly according to claim 1, wherein said clamp ring has located on its outer surface a plurality of radially oriented ribs.

7. A coupling assembly according to claim 1, wherein a side connection is provided by a fitting having an annular rim being attached into the male head part by casting the head part around the fitting.

8. A quick-connect coupling assembly having mating head parts each integrally attached to a pipe, comprising:
- (a) a male head part integrally cast around an outwardly flared end of a pipe, said male part having located at its forward end a radially outwardly extending annular ring having an annular recess;
- (b) a female head part integrally cast around an outwardly flared end of a pipe, said female part having located at its forward end an inner curved recess adapted for receiving an annular seal ring and having a curved outer surface located rearwardly from the inner recess;
- (c) a resilient circular-shaped seal ring provided in the inner curved recess of said female head part for sealing against an outer surface of said male head part;
- (d) a clamping unit encircling same female head part and adapted to mate with the curved outer surface of said female head part, said clamping unit including a clamp ring having located on its outer surface a plurality of radially oriented ribs, and at least one short hook and at least one long hook having a handle grip pivotally attached to the clamp ring, said hooks being adapted for engaging the annular recess of said male head part and said long hook is clamped to said male head part by a toggle device; and
- (e) an annular-shaped stopper ring attached to said female head part rearwardly of the clamping unit, whereby said male head part and said female head part can be quickly and sealably attached together to provide a coupling assembly.

* * * * *